(12) United States Patent
Fischer et al.

(10) Patent No.: US 6,715,976 B2
(45) Date of Patent: Apr. 6, 2004

(54) EXPANSION ANCHOR

(75) Inventors: Rainer Fischer, Waldachtal (DE); Willi Haug, Freudenstadt (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/182,036

(22) PCT Filed: Jan. 19, 2001

(86) PCT No.: PCT/EP01/00597

§ 371 (c)(1),
(2), (4) Date: Jul. 24, 2002

(87) PCT Pub. No.: WO01/66962

PCT Pub. Date: Sep. 13, 2001

(65) Prior Publication Data

US 2003/0077141 A1 Apr. 24, 2003

(30) Foreign Application Priority Data

Mar. 9, 2000 (DE) .......................................... 100 11 565

(51) Int. Cl.⁷ ................................................ F16B 13/06
(52) U.S. Cl. ...................................... 411/54; 411/80.5
(58) Field of Search .................. 411/54, 54.1, 57.1, 411/60.2, 55, 59, 71, 80.6, 80.5

(56) References Cited

U.S. PATENT DOCUMENTS 5,779,410 A 7/1998 Lautenschlaeger

FOREIGN PATENT DOCUMENTS

| DE | 193 478 C | 1/1908 | |
| DE | 3318800 A1 * | 11/1984 | ........... F16B/13/14 |
| DE | 36 09 562 A | 9/1987 | |
| DE | 197 07 604 A | 9/1997 | |
| EP | 1 026 413 A | 8/2000 | |

* cited by examiner

Primary Examiner—Heather Shackelford
Assistant Examiner—Lisa M. Saldano
(74) Attorney, Agent, or Firm—Michael J. Striker

(57) ABSTRACT

An expansible fixing plug (10) has an expansion screw (14), which is located in an expansible fixing plug sleeve (12). In accordance with the invention, a screw thread (30) is of saw tooth construction and a rear part (16) of the fixing plug sleeve (12) is axially extendable. When the expansible fixing plug (10) is subjected to axial loading the expansion screw (14) moves axially in the fixing plug sleeve (12) and the screw thread (30) expands the fixing plug sleeve (12). The expansible fixing plug (10) therefore has a subsequent-expansion behavior when a drilled hole becomes enlarged. The expansible fixing plug (10) can be mounted by hammering in without turning the expansion screw (14). The core diameter of the screw thread (30) enlarges from the front to the rear to increase the capacity of the expansion screw (14) to withstand transverse loading.

9 Claims, 3 Drawing Sheets

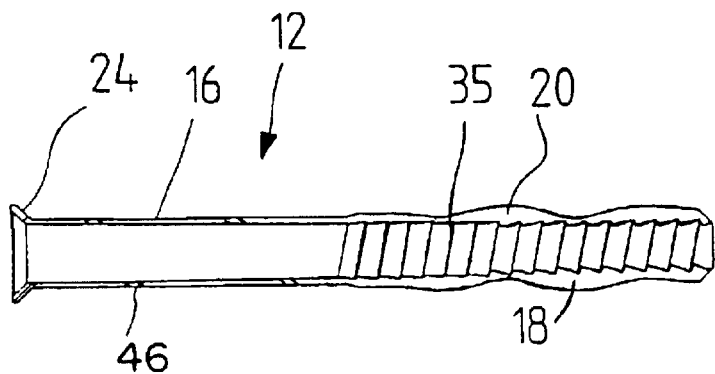
Fig. 3
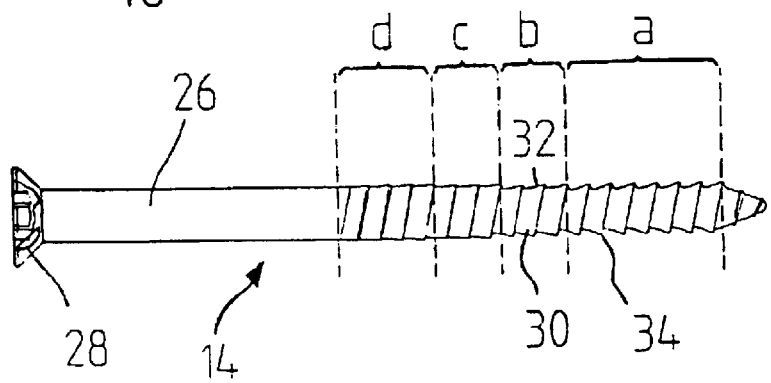
Fig. 4
Fig. 4d
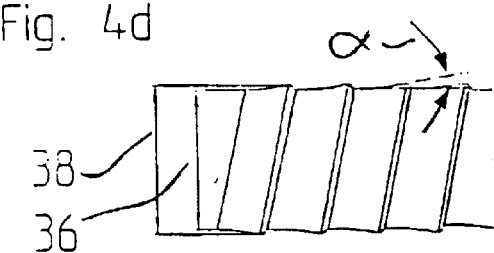
Fig. 4c
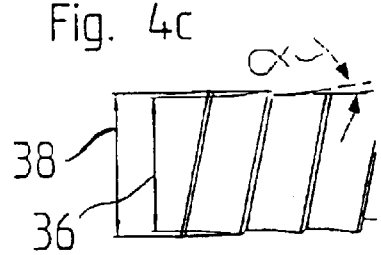
Fig. 4b
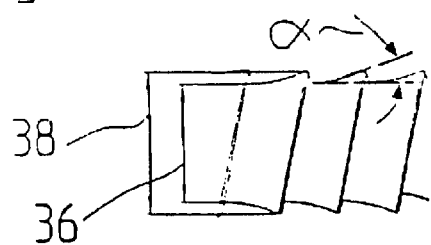
Fig. 4a
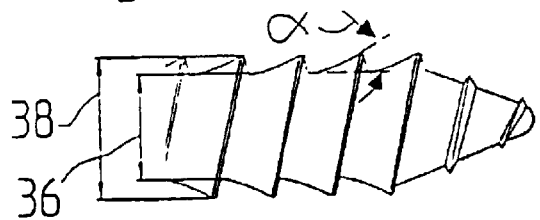

EXPANSION ANCHOR

BACKGROUND OF THE INVENTION

The invention relates to an expansible fixing plug.

Such expansible fixing plugs are known per se. They comprise a fixing plug sleeve, into which an expansion screw can be screwed, wherein the expansion screw, as it is screwed in, widens the fixing plug. Normally, the fixing plug sleeve has longitudinal slits or slits running at an angle to the lengthwise direction, which divide the fixing plug sleeve into expansible tongues, which are expanded by screwing in the expansion screw. A further possibility is to manufacture the fixing plug sleeve from a resiliently and/or plastically expandable material, especially from a plastics material. As a consequence of the widening or expansion, the expansible fixing plugs are anchored in a drilled hole, for example in masonry.

The known expansible fixing plugs have the drawback that they become loose when the drilled hole becomes enlarged, for example, as a consequence of cracks developing in the masonry, and their anchoring or withdrawal force decreases.

The invention is based on the problem of constructing an expansible fixing plug of the kind mentioned in the introduction in such a way that it has a high anchoring or withdrawal force when the drilled hole becomes enlarged.

SUMMARY OF THE INVENTION

That problem is solved in accordance with the present invention. The expansion screw of The inventive expansible fixing plug has a screw thread, the rear flank of which in the screwing-in direction runs at a shallow angle of about 45° or less to the axial direction of the expansion screw. The flank of the screw thread at the rear in the screwing-in direction forms an oblique or expansion surface, which additionally widens or expands the fixing plug sleeve when the expansion screw is subjected to axial loading in the withdrawal direction. The screw thread forms a cone-like expander body. If a drilled hole in which the expansible fixing plug according to the invention is anchored becomes enlarged, then—when the expansion screw is loaded axially—the expansion screw is pulled a little way axially out of the fixing plug sleeve. As this happens, the flank of the screw is pulled a little way axially out of the fixing plug sleeve. As this happens, the flank of the screw thread at the rear in the screwing-in direction standing at a shallow angle of about 45° or less to the axial direction expands the fixing plug sleeve further, the expansible fixing plug is expanded further remains anchored in the drilled hole with more or less unchanged anchoring force.

The expansible fixing plug according to the invention has the advantage that it has the ability to expand subsequently and is therefore suitable for use in zones subject to tensile forces. A further advantage is a high anchoring force also in a drilled hole that has not become enlarged, and an advantageous ratio between screwing-in torque of the expansion screw necessary to expand the fixing plug sleeve and the anchoring force of the expansible fixing plug in the drilled hole.

Furthermore, the expansion screw of the inventive expansible fixing plug has a core diameter that increases over the length of its screw thread from the front to the rear. The core diameter can increase in steps or gradually. The rearwardly increasing core diameter has the advantage that the screw thread is able to accommodate a relatively large transverse force (bending and shearing stress) in the rear region. The expansion screw is therefore capable of supporting a relatively large load suspended on its rear end and subjecting the expansion screw to transverse load. In addition, a relatively large tensile stress on the expansion screw is also possible, of course, which decreases towards the leading end over the length of the screw thread. Furthermore, the screw thread can be formed right up to the rear end of the expansion screw without sharply reducing the ability of the screw thread to withstand stress as a consequence of a reduction in cross-section of and a stress concentration in of the screw thread. This has the advantage that the fixing plug sleeve can be expanded and subsequently expanded by means of the expansion screw close to a surface, for example of masonry, in which the expansible fixing plug according to the invention is anchored.

In a preferred construction of the invention, the screw thread has a saw-tooth profile, the shallower and longer flank of which, forming the expansion surface, is directed rearwards in the screwing-in direction of the expansion screw. This construction of the invention exhibits good screwing-in behaviour of the expansion screw into the fixing plug sleeve. A further advantage is a large expansion area, formed by the thread flank at the rear in the screwing-in direction, in relation to the axial length of the screw thread.

In a preferred construction of the invention, the core diameter at the rear end of the screw thread corresponds approximately to the diameter of the threadless screw shank adjoining the rear end of the screw thread. In this way, a substantially progressive transition from screw thread to screw shank is achieved. A cross-sectional weakening or stress concentration at the transition from screw thread to screw shank is largely avoided in this construction of the invention. This is particularly advantageous because the transition from screw thread to screw shank is normally located close to a surface, for example of masonry, in which the expansible fixing plug is anchored. Transverse stress on the expansion screw is greatest at the surface of the masonry.

In one construction of the invention, the angle at which the flank of the screw thread at the rear in the screwing-in direction runs is about 28° at the leading end of the screw thread. This produces an angle of taper of approximately 56°, angle of taper referring to the angle of the flank at the rear in the screwing-in direction at opposite points on the screw thread. The angle at which the flank at the rear in the screwing-in direction runs decreases towards the rear end of the screw thread to about 7°, which corresponds to an angle of taper of about 14°. The said angles produce a good ratio between axial force exerted on the expansion screw in the withdrawal direction and expansion force exerted by this force from the expansion screw on the fixing plug sleeve.

If the expansion screw is used in combination with a fixing plug sleeve manufactured from a relatively hard plastics material, it is advantageous to give the shallower and longer thread flank of the screw thread a concave form. The point angle of the thread therefore becomes somewhat smaller, so that the thread cuts its way more easily into the material. Furthermore, the run-out of the thread flank becomes shallower by virtue of the concave construction, which reduces friction at the start of axial displacement of the expansion screw in the fixing plug sleeve for subsequent expansion of the expansible fixing plug and increases it only as the axial displacement progresses. A subsequent-expansion behaviour in which the expansion force of the expansible fixing plug increases progressively with axial displacement is thereby achieved. A further advantage of a concave flank of the screw thread at the rear in the screwing-in direction is a reduced stress concentration by virtue of the relatively small flank angle at the root of the thread.

To create the necessary axial ability to move of the expansion screw for widening and subsequent expansion of the expansible fixing plug, in one construction of the invention the fixing plug sleeve has a yield and/or rupture point, which enables the fixing plug sleeve to elongate axially or to separate into two parts when the fixing plug sleeve is subjected to axial loading. If the fixing plug sleeve of the expansible fixing plug according to the invention is axially loaded, it elongates axially or is separated into two parts. When subjected to axial loading, the rear part of the fixing plug sleeve moves axially, together with the expansion screw located therein, a little way away from a front part of the fixing plug sleeve anchored in the masonry. This displacement causes the expansion screw to expand the fixing plug sleeve in its front region, as described above, and thereby anchor the expansible fixing plug in the drilled hole. The described axial movement of the rear part of the fixing plug sleeve jointly with the expansion screw located therein with respect to the front part of the fixing plug sleeve anchored in the masonry also occurs when the drilled hole becomes enlarged, for example, as a consequence of cracks developing in the masonry, so that the expansible fixing plug according to the invention expands subsequently when the drilled hole becomes enlarged. As already mentioned, the anchoring or withdrawal force of the expansible fixing plug according to the invention remains more or less unchanged by this subsequent expansion when the drilled hole becomes enlarged.

A yield and/or rupture point are not necessarily alternatives, they may be one and the same. When the expansible fixing plug is subjected to axial loading, the yield and/or rupture point can initially allow an axial elongation of the fixing plug sleeve. If the axial loading increases, the fixing plug sleeve separates into two parts at the yield and/or rupture point. The yield and/or rupture point can be formed, for example, by a reduction in the wall thickness of the fixing plug sleeve, or by providing a circumferential or alternatively a helically running groove on the fixing plug sleeve.

The construction of a yield and/or rupture point on the fixing plug sleeve of the expansible fixing plug according to the invention has in particular the advantage that the expansible fixing plug can be introduced, for example, hammered, into a drilled hole with the expansion screw already located in the fixing plug sleeve. It is not necessary first of all to introduce the fixing plug sleeve into the drilled hole without the expansion screw and then to screw in the expansion screw, the operation of screwing in the expansion screw can be omitted. The expansion screw widens and/or expands the expansible sleeve when subjected to axial loading in the withdrawal direction so that the expansible fixing plug according to the invention is anchored in the drilled hole by the loading. Expansion of the expansible sleeve by screwing in the expansion screw is superfluous. If required, after the expansible fixing plug has been introduced into the drilled hole the expansion screw located in the fixing plug sleeve can be briefly tightened to bring about widening and/or expansion of the fixing plug sleeve, and hence anchoring of the expansible fixing plug in the masonry, even with no loading on the expansible fixing plug.

Because it is possible to introduce the expansible fixing plug according to the invention with the expansion screw located in the fixing plug sleeve into a drilled hole, without screwing in the expansion screw, anchoring of the expansible fixing plug according to the invention is simplified and shortened. There is the added advantage that when the fixing plug sleeve is manufactured, for example, by injection-moulding, from plastics material, the expansion screw can be used as core. The expansion screw is placed as the core in an injection-moulding tool and the plastics material forming the fixing plug sleeve is subsequently injected around it. A separate core is therefore unnecessary, as it hollowing out of such a separate core from the fixing plug sleeve after injection-moulding and screwing the expansion screw into the fixing plug sleeve. The expansible fixing plug with the expansion screw, around which the fixing plug sleeve has been injected, is ready for immediate use after removal from the mould. A parting agent applied to the expansion screw prior to injection-moulding of the fixing plug sleeve acts as a lubricating layer, which ensures easy-running axial displacement of the expansion screw in the fixing plug sleeve and hence ensures a good ratio of expansion force to axial loading.

In a preferred construction, the fixing plug sleeve departs in an expansion region from, for example, a cylindrical form with a notional straight axis; at least in the expansion region, the fixing plug sleeve has, for example, an undulation in the lengthwise direction or a helical form. Expressed in more general terms, a surface of the fixing plug sleeve in the expansion region runs in the lengthwise direction at an angle to a notional cylindrical surface or to the longitudinal axis of the fixing plug. At the same time, the angle at which the surface of the fixing plug sleeve runs to the longitudinal axis of the expansible fixing plug changes over the length of the fixing plug sleeve. The purpose of this construction of the invention is to render the fixing plug sleeve deformable in a transverse direction in the expansion region. As it is driven into a drilled hole, the fixing plug sleeve is deformed in the sense of being straightened out; for example, when the fixing plug sleeve is of undulating construction, the crests of the undulation are pressed radially inwards. The fixing plug sleeve is consequently located under bias in the drilled hole.

BRIEF DESCRIPTION OF THE DRAWINGS

The invention is explained in detail below with reference to an exemplary embodiment of the invention illustrated in the drawings, in which:

FIG. 3 shows the fixing plug sleeve from FIG. 2 in axial section;

FIG. 4 shows an expansion screw of the expansible fixing plug from FIG. 1 in side view;

FIGS. 4a–d are views to an enlarged scale of portions of a screw thread of the expansion screw from FIG. 4.

DETAILED DESCRIPTION OF THE PREFERRED EMBODIMENTS

Figure 1:
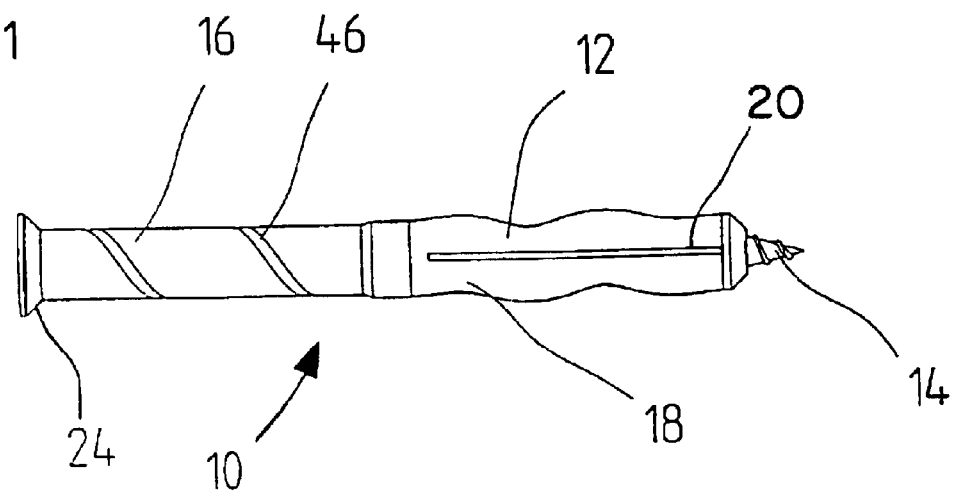
FIG. 1 shows an expansible fixing plug according to the invention in side view.
Figure 2:
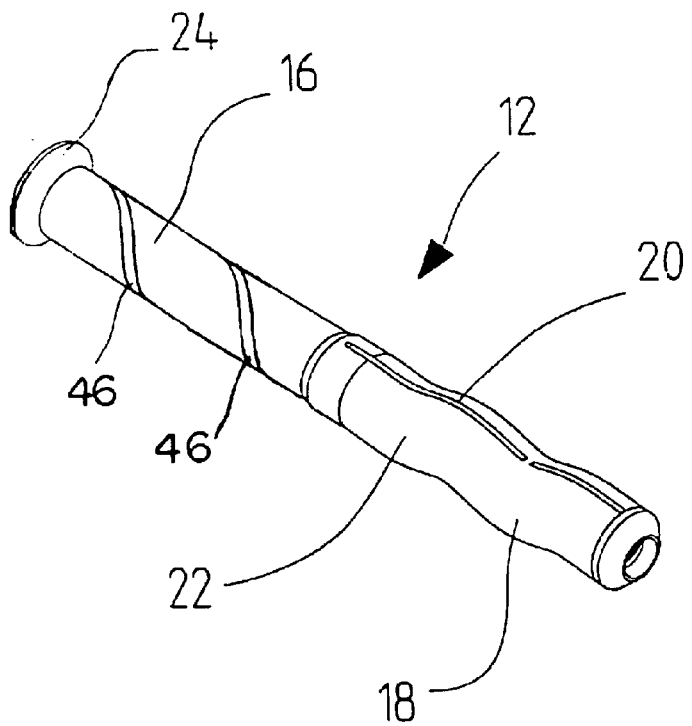
FIG. 2 is a perspective view of a fixing plug sleeve of the expansible fixing plug from FIG. 1.

The expansible fixing plug 10 according to the invention illustrated in FIG. 1 comprises a fixing plug sleeve 12 manufactured from plastics material, as illustrated in FIGS. 2 and 3, and an expansion screw 14, which is located in the fixing plug sleeve 12 and is illustrated in FIG. 4. The expansion screw 14 consists of metal, especially steel.

The fixing plug sleeve 12 has an approximately hollow-cylindrical form with a hollow-cylindrical shank 16, which constitutes a rear part of the fixing plug sleeve 12. A front part 18 of the fixing plug sleeve 12 has a form departing from a cylindrical form; the front part 18 has an undulation running in the lengthwise direction of the expansible fixing plug 10. This front part 18 of the fixing plug sleeve 12 forms an expansion region 18 of the fixing plug sleeve 12. The expansion region 18 of the fixing plug sleeve 12 is provided with discontinuous longitudinal slits 20, which divide the expansion region 18 into expansible limbs 22. If the fixing plug sleeve 12 is manufactured from an extensible material, such as plastics material, the longitudinal slits 20 are not absolutely necessary since the extensibility of the material of the fixing plug sleeve 12 imparts sufficient expansibility to the expansion region 18.

The shank 16, which forms the rear part of the fixing plug sleeve 12, has a groove 46 winding helically around the shank 16 and forming a yield and/or rupture point 46. By virtue of a reduction in the wall thickness of the shank 16 at the base of the groove 46, the groove forming the yield and/or rupture point allows the shank 16 to extend axially. With relatively large axial loading, the shank 16 of the fixing plug sleeve 12 may also tear at the groove 46.

The shank 16 has a hollow conical collar 24 at the rear end of the fixing plug sleeve 12.

The expansion screw 14 of the expansible fixing plug 10 comprises a cylindrical, smooth-walled shank 26, the length of which corresponds approximately to the length of the shank 16 of the fixing plug sleeve 12. At its rear end, the expansion screw 14 has a frustoconical screw head 28. At the leading end, a screw thread 30 is formed integral with the shank 26 of the expansion screw 14, and has a length approximately corresponding to the length of the expansion region 18 of the fixing plug sleeve 12. The screw thread 30 terminates in point at the leading end of the expansion screw 14.

The screw thread 30 has a saw-tooth profile, a flank 32 of the screw thread 30 at the rear in the screwing-in direction runs at a shallow angle and a flank 34 of the screw thread 30 at the front in the screwing-in direction runs at a steep angle to the axial direction of the expansion screw 14. The core diameter of the screw thread 30 changes over the length thereof, the core diameter increases from front to rear. In this connection, the core diameter of the screw thread 30 can increase progressively from front to rear. In the exemplary embodiment illustrated, the screw thread 30 is divided from front to rear into four axial sections a–d, the dimensions of the screw thread being identical within each of these sections a–d but varying from section to section. The sections a–d of the screw thread 30 are illustrated to an enlarged scale in the corresponding FIGS. 4a–d. In the exemplary embodiment illustrated, the shank 26 has a diameter of 7 mm. The core diameter 36 of the screw thread 30 is 5.2 mm in section a, 5.9 mm in section b, 6.9 mm in section c and 7.2 mm in the last section d. This means that the core diameter 36 of the screw thread 30 at the transition to the smooth-walled shank 26 is about as large as the diameter of the shank 26, so that the screw thread 30 merges gradually into the shank 26.

In the exemplary embodiment of the expansion screw 14 illustrated, the outer diameter 38 of the screw thread 30 is 7.2 mm in the sections a and b, 7.4 mm in section c and 7.7 mm in section d. In the exemplary embodiment of the expansion screw 14 illustrated, an angle a between the flank 32 of the screw thread 30 at the rear in the screwing-in direction and the axial direction is about 28° in section a, about 20° in section b and about 7° in sections c and d. The rear flank 32 is concavely curved in the lengthwise direction of the expansion screw 14, as is especially clear from FIGS. 4a and b.

The flank 34 of the screw thread 30 at the front in the screwing-in direction is steeply oriented, and effects an interlocking fit in the axial direction between the expansion screw 14 and the fixing plug sleeve 12, so that as the expansible fixing plug 10 is being driven into a drilled hole the expansion screw 14 transfers the impact energy to the fixing plug sleeve 12. This prevents the fixing plug sleeve 12 from being axially compressed as the expansible fixing plug 10 is being hammered in.

When the expansion screw 12 of the expansible fixing plug 10 is manufactured, for example, by injection-moulding from plastics material, the expansion screw 14 can be placed as core in a cavity of an injection-moulding tool, not illustrated, and the plastics material forming the fixing plug sleeve 12 can be injected around it. A parting agent applied to the expansion screw 14 prior to injection-moulding forms a lubricating layer, which prevents the fixing plug sleeve 12 from adhering to the expansion screw 14 and ensures the ability to move of the expansion screw 14 in the fixing plug sleeve 12.

Figure 5:
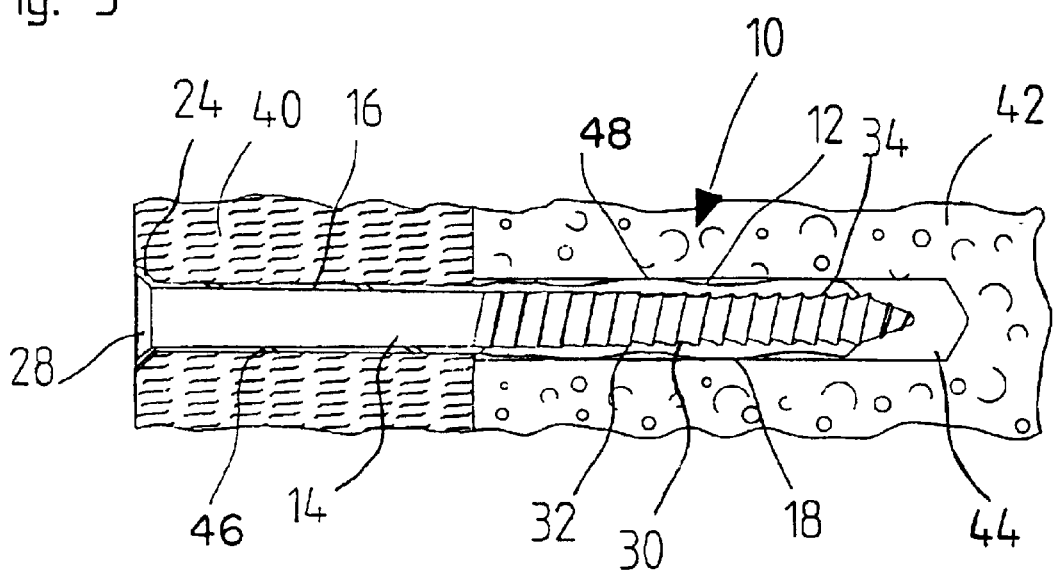
FIG. 5 shows the use of the expansible fixing plug from FIG. 1 in axial section.

FIG. 5 illustrates a use of the expansible fixing plug 10 for fixing a component, for example, a piece of timber 40 to masonry 42. The expansible fixing plug 10, with the expansion screw 14 located in the fixing plug sleeve 12, is pushed through a hole in the timber part 40 and hammered into a hole 44 drilled in the masonry 42. The steeply oriented flank 34 of the screw thread 30 at the front in the screwing-in direction produces an interlocking fit in the axial direction between the expansion screw 14 and the fixing plug sleeve 12 which, as the expansible fixing plug 10 is hammered into the drilled hole 40[1], transfers impact energy to the fixing plug sleeve 12. On being driven into the drilled hole 44, the expansion region 18 of the fixing plug sleeve 12 having the undulation is deformed; the crests 48 of the undulation are pressed radially inwards by the wall of the drilled hole 44. This deformation of the expansion region 18 produces a bias, with which the expansible fixing plug 10 is located in the drilled hole 44.

[1]Presumably in error for 44, 40 is the hole in the timber part-translator.

The rear flank 32 of the screw thread 30 running at a shallow angle to the axial direction of the expansion screw 14 forms an oblique or expansion surface, which radially widens or expands the fixing plug sleeve 12 in the expansion region 18 when the expansion screw 14 is moved axially towards the rear end of the expansible fixing plug 10 in relation to the fixing plug sleeve 12. Such an axial movement of the expansion screw 14 in relation to the fixing plug sleeve 12 is effected when the expansible fixing plug 10 is subjected to axial loading. Such an axial loading acts as a tensile force, which is exerted by the timber part 40 on the collar 24 of the fixing plug sleeve 12 and from that to the head 28 of the expansion screw 14. Such a tensile force causes an axial lengthening of the shank 16 of the fixing plug sleeve 12 provided with the helical groove 46 (yield and/or rupture point) and consequently an axial displacement of the screw thread 30 of the expansion screw 14 in the expansion region 18 of the expansible sleeve 12. During this axial movement of the expansion screw 14, the rear flank 32 of the screw thread 30 running at a shallow angle widens the expansion region 18 of the fixing plug sleeve 12, whereby the expansible fixing plug 10 is anchored with high anchoring force in the hole 44 drilled in the masonry 42. The axial movement of the expansion screw 14 in the fixing plug sleeve 12 amounts to a fraction of the height of one turn of the screw thread 30 in the axial direction. The expansion screw 14 already located in the fixing plug sleeve 12 prior to hammering the expansible fixing plug 10 into the drilled hole 44 does not need to be screwed into the fixing plug sleeve 12 to expand the fixing plug sleeve 12 and hence to anchor the expansible fixing plug 10 in the masonry 42; fixing of the timber part 40 to the masonry 42 can be effected exclusively by hammering in the expansible fixing plug 10 together with the expansion screw 14 located in the fixing plug sleeve 12.

If the drilled hole 44 enlarges, for example, as a consequence of cracks developing in the masonry 42, when the expansible fixing plug 10 is subjected to axial loading the expansion screw 14 is moved in the fixing plug sleeve 12 a little further axially towards the rear end of the expansible fixing plug 10. As it does so, screw thread 30 expands the fixing plug sleeve 12 further in the expansion region 18, so that the expansible fixing plug 10 remains anchored in the drilled hole 44 with approximately unchanged withdrawal force even when the drilled hole enlarges. The expansible fixing plug 10 exhibits a subsequent expansion behaviour that makes it suitable for use in zones subject to tensile forces.

Once the expansible fixing plug 10 has been hammered into the masonry 44, the expansion screw 14 can also be briefly tightened to expand the expansion region 18 of the fixing plug sleeve 12 and hence to anchor the expansible fixing plug 10 in the masonry 42 without axial movement of the expansion screw 14. In principle, it is also possible to introduce the expansible fixing plug 10 into the drilled hole 44 without an expansion screw 14 and to screw in the expansion screw 14 in order to expand the expansion region 18 of the fixing plug sleeve 12 and hence to anchor the expansible fixing plug 10 in the masonry 42.

In conjunction with the expansion screw 14 according to the invention, forms of the fixing plug sleeve 12 other than the illustrated form can also be used. For example, it is possible to make the expansion region 18 of the fixing plug sleeve 12 of cylindrical form with circumferential grooves at least over a part of the expansion region 18.

What is claimed is:

1. Expansible fixing plug, comprising an expansible fixing plug sleeve and having an expansion screw for expanding the fixing plug sleeve, wherein the expansion screw (14) has a screw thread (30), wherein a rear flank (32) of the screw thread in the screwing-in direction makes a shallow angle of about 45° or less to an axial direction of the expansion screw (14), wherein the screw thread (30) has a core diameter (36) that increases over a length of the screw thread (30) from a front to a rear of the screw thread, wherein the fixing plug sleeve is made of plastic, and wherein the screw thread is engaged with the fixing plug sleeve.

2. Expansible fixing plug according to claim 1, wherein the screw thread (30) of the expansion screw (14) has a saw-tooth profile, a steeper and shorter flank (34) of the screw thread (30) being arranged at the front in the screwing-in direction of the expansion screw (14) and a shallower and longer flank (32) of the screw thread being arranged at the rear in the screwing-in direction of the expansion screw (14).

3. Expansible fixing plug according to claim 1, wherein the core diameter (36) of the screw thread (30) at a rear end of the screw thread (30) corresponds approximately to a diameter of a shank (26) of the expansion screw (14) adjoining the rear end of the screw thread (30).

4. Expansible fixing plug according to claim 1, wherein the flank (32) of the screw thread (30) at the rear in the screwing-in direction has an angle to the axial direction of the expansion screw (14) that declines from about 28° at a leading end of the screw thread (30) to about 7° at a rear end of the screw thread (30).

5. Expansible fixing plug according to claim 1, wherein the flank (32) of the screw thread (30) at the rear in the screwing-in direction is concave in a lengthwise direction of the expansion screw (14).

6. Expansible fixing plug according to claim 1, wherein the fixing plug sleeve (12) has a yield and/or rupture point (46), wherein said yield and/or rupture point enables the fixing plug sleeve (12) to elongate axially or to separate into two parts.

7. Expansible fixing plug according to claim 1, wherein in an expansion region (18) the fixing plug sleeve (12) has an uneven form in the lengthwise direction, the surface of which in the lengthwise direction runs at an angle to the axial direction of the fixing plug sleeve (12), the angle changing over the length of the expansion region (18).

8. Expansible fixing plug according to claim 7, wherein in the region (18) the fixing plug sleeve (12) has an undulation in the lengthwise direction.

9. Expansible fixing plug, comprising an expansible fixing plug sleeve and having an expansion screw for expanding the fixing plug sleeve, wherein the expansion screw (14) has a screw thread (30), wherein a rear flank (32) of the screw thread in the screwing-in direction makes a shallow angle of about 45° or less to an axial direction of the expansion screw (14), wherein the screw thread (30) has a core diameter (36) that increases over a length of the screw thread (30) from a front to a rear of the screw thread, wherein the fixing plug sleeve (12) has a yield and/or rupture point (46), wherein said yield and/or rupture point enables the fixing plug sleeve (12) to elongate axially or to separate into two parts.

* * * * *